(12) United States Patent
James

(10) Patent No.: US 8,826,936 B2
(45) Date of Patent: Sep. 9, 2014

(54) FLOAT DEVICE

(75) Inventor: Michael John James, Cardiff (GB)

(73) Assignee: Fuel Active Limited, St. Mellons (GB)

( * ) Notice: Subject to any disclaimer, the term of this patent is extended or adjusted under 35 U.S.C. 154(b) by 325 days.

(21) Appl. No.: 13/321,843

(22) PCT Filed: May 24, 2010

(86) PCT No.: PCT/GB2010/050846
§ 371 (c)(1),
(2), (4) Date: Nov. 22, 2011

(87) PCT Pub. No.: WO2010/136791
PCT Pub. Date: Dec. 2, 2010

(65) Prior Publication Data
US 2012/0067442 A1 Mar. 22, 2012

(30) Foreign Application Priority Data

May 26, 2009 (GB) .................................. 0908969.9

(51) Int. Cl.
*B01D 35/05* (2006.01)
*B01D 33/01* (2006.01)
*B60K 15/077* (2006.01)

(52) U.S. Cl.
CPC .................................... *B60K 15/077* (2013.01)
USPC ........ 137/547; 137/578; 137/592; 210/167.2; 210/242.1

(58) Field of Classification Search
USPC .......................... 137/578, 590, 592, 398, 547; 210/242.1, 167.2, 170.05
See application file for complete search history.

(56) References Cited

U.S. PATENT DOCUMENTS

| | | | | |
|---|---|---|---|---|
| 2,840,147 A * | 6/1958 | Almestad | ........................ | 137/266 |
| 4,094,338 A * | 6/1978 | Bauer | ........................... | 137/578 |
| 4,179,379 A * | 12/1979 | Mitchell | .................... | 210/242.1 |
| 4,313,233 A * | 2/1982 | Roberts | ............................ | 4/321 |
| 4,626,347 A | 12/1986 | Neglio | | |
| 4,632,139 A * | 12/1986 | Delwichwe | .................... | 137/172 |
| 4,663,037 A * | 5/1987 | Breslin | ..................... | 210/170.07 |
| 4,745,942 A * | 5/1988 | Delwiche | ...................... | 137/172 |
| 4,998,585 A * | 3/1991 | Newcomer et al. | ........... | 166/105 |
| 5,133,854 A * | 7/1992 | Horvath | ........................ | 210/121 |
| 5,195,664 A * | 3/1993 | Rhea | ........................... | 222/464.4 |
| 5,384,033 A * | 1/1995 | Matasovic | ..................... | 210/121 |
| 5,525,216 A * | 6/1996 | Matasovic | ..................... | 210/121 |
| 5,687,609 A * | 11/1997 | Schmalzel | .................... | 73/322.5 |
| 5,924,445 A | 7/1999 | Ambrose et al. | | |
| 6,196,310 B1 * | 3/2001 | Knight | ........................ | 166/105.5 |
| 6,915,818 B2 * | 7/2005 | Burris et al. | .................... | 137/544 |
| 6,990,998 B1 * | 1/2006 | Amellal et al. | ................. | 137/547 |
| 2002/0064090 A1 * | 5/2002 | Su | ..................................... | 367/99 |

FOREIGN PATENT DOCUMENTS

DE 4104903 8/1991
DE 4339684 5/1995

(Continued)

*Primary Examiner* — Atif Chaudry
(74) *Attorney, Agent, or Firm* — Gordon & Jacobson, PC

(57) ABSTRACT

A float device for use in drawing liquids such as fuel from a tank or other reservoir is disclosed. The device comprises a float arranged for rising and falling with the level of liquid in the tank and a liquid pick-up duct, which comprises a flexible tube having its free end coupled to the float. The float is arranged for vertical movement within a filter or other member, which encloses the float and the flexible tube. The filter or other member is elongate and tubular in construction and comprises an open lower end.

18 Claims, 4 Drawing Sheets

(56) References Cited

FOREIGN PATENT DOCUMENTS

| | | |
|---|---|---|
| DE | 19530256 | 1/1997 |
| EP | 0749860 | 12/1996 |
| GB | 1 578 306 | 11/1980 |
| GB | 2350337 | 10/2002 |
| GB | 2 446 011 A | 7/2008 |
| GB | 2446011 A * | 7/2008 |
| KR | 20010092497 | 10/2001 |

* cited by examiner

FLOAT DEVICE

CROSS-REFERENCE TO RELATED APPLICATIONS

This application is a national stage application of PCT/GB2010/050846 filed on May 24, 2010 and claims priority from GB 0908969.9, filed on May 26, 2009, which is hereby incorporated by reference in its entirety.

BACKGROUND

1. Technical Field

This invention relates to a float device for use in drawing liquids such as fuel from a tank or other reservoir.

2. Related Art

In conventional fuel tanks, the fuel is drawn from a point adjacent the bottom of the tank in order to enable the pick-up of fuel even when the level of fuel in the tank is low. However, a disadvantage of this arrangement is that any water and/or sediment which has accumulated at the bottom of the tank can be drawn up with the fuel.

UK Patent Number GB2 350 337B discloses a solution to this problem in the form of a float device having a float arranged for rising and falling with the level of fuel in the tank, and a fuel pick up duct which comprises a flexible tube having its free end coupled to the float, the float being arranged for vertical movement within a filter which encloses the float and the flexible tube.

In use, the float ensures that the fuel entry or pick-up end of the tube is always adjacent the surface of the fuel in the tank. Accordingly, the pick-up point is always adjacent the surface of the fuel in the tank and thus the risk of drawing up a sediment or water is alleviated.

The filter in which the float moves vertically comprises an elongate perforated tube which is closed at its lower end by a solid or perforated end wall. A disadvantage of this arrangement is that the length of the filter needs to be accurate, otherwise it will abut the bottom of the tank and prevent the device from fitting properly. Alternatively, if the filter is too short, the pick-up end of the tube will not reach to the bottom of the tank and as such the fuel capacity of the tank is not maximised.

SUMMARY

I have now devised a float device which alleviates the above-mentioned problems.

In accordance with the present invention as seen from a first aspect, there is provided a float device for use in drawing liquids such as fuel from a tank or other reservoir, the device comprising a liquid pick-up arrangement arranged to rise and fall with the level of liquid in the tank, and a liquid pick-up duct which comprises a flexible tube having its free end coupled to the arrangement, the liquid pick-up arrangement comprising a float and a float housing, the float and float housing defining a liquid pick-up passage, the liquid pick-up arrangement being arranged for movement within an elongate member which encloses the arrangement and the flexible tube and which comprises an open lower end.

In use, the device operates in the same manner as the float device of UK Patent Number GB2 350 337B. However, the lower end of the elongate member is open thereby allowing the liquid pick-up arrangement to extend partially below the elongate member when the level of fuel in the tank is low. In this way a device with a slightly shorter member can be fitted into a tank to ensure that the device fits and to allow for manufacturing tolerances or deformations in the tank. When the level of fuel is low, the pick-up arrangement extends below the level of the member so that more fuel can be drawn from the tank compared with the device disclosed in UK Patent Number GB2 350 337B. It will be appreciated that a device having a member of a particular length can thus be fitted to tanks having a range of different depths.

Preferably, the float is disposed substantially within the housing.

The liquid pick-up passage is preferably defined between an outer surface of the float and an inner surface of the housing. Alternatively, or in addition thereto, the liquid pick-up passage extends substantially within the float. In yet a further alternative, or as a further addition thereto, the liquid pick-up passage extends through the float.

Preferably, the float and/or housing comprises spacing means for spacing an outer region of the float from an inner region of the housing.

The liquid pick-up passage is preferably substantially defined by the region between the outer surface of the float and the inner surface of the housing that are spaced from each other.

The housing preferably comprises coupling means for coupling the tube thereto.

Preferably, the tube is in fluid communication with the liquid pick-up passage.

The housing preferably comprises filter means arranged to filter the liquid being drawn along the liquid pick-up passage.

The housing preferably comprises an apertured lower wall, so that fuel can be drawn right down to the point where the liquid pick arrangement abuts the bottom of the tank. Preferably, the lower wall is substantially frusto-conical in shape.

Preferably, the filter means comprises the apertured lower wall of the housing.

Preferably, a bottom surface of the lower wall is profiled or comprises projections which prevent the apertured wall from abutting the bottom surface of the tank and thereby inhibiting the flow of liquid.

In accordance with the present invention, as seen from a second aspect, there is provided a float device for use in drawing liquids such as fuel from a tank or other reservoir, the device comprising a float arranged for rising and falling with the level of liquid in the tank, and a liquid pick-up duct which comprises a flexible tube having its free end coupled to the float, the float being arranged for movement within an elongate member which encloses the float and the flexible tube and which comprises an open lower end.

Preferably, the float device comprises at least two floats arranged to rise and fall with the level of liquid within the tank or reservoir. Preferably, each of the at least two floats comprise a liquid pick-up duct, which comprises a flexible tube having a free end thereof coupled to the respective float. Alternatively or in addition thereto, the or each float comprises at least two liquid pick-up ducts which separately comprise a flexible tube having a free end thereof coupled to the or each float.

The use of more than one tube enables more liquid, for example fuel, to be extracted from the tank to operate heavy machinery requiring a large fuel supply.

The liquid from the at least two tubes is preferably combined.

Preferably, the or each of the at least two floats are arranged for vertical movement within an elongate member.

The or each float preferably carries filter means arranged to filter the liquid being drawn up the or each tube.

Preferably, the or each float comprises a hollow chamber to which said tube or tubes are connected, the or each chamber comprising an apertured wall forming said filter means.

Preferably the apertured wall forms the bottom wall of the or each float, so that filtered fuel can be drawn right down to the point where the or each float abuts the bottom of the tank.

The or each tube is preferably coupled to the or each chamber by passing the tube through an eyelet formed on the float. Preferably, the or each eyelet comprises at least one protrusion disposed on the inner periphery thereof for gripping the respective tube.

Also in accordance with this invention, as seen from a third aspect, there is provided a float device for use in drawing liquids such as fuel from a tank or other reservoir, the device comprising at least one float arranged for rising and falling with the level of liquid in a reservoir, and at least one liquid pick-up duct which comprises a flexible tube having its free end coupled to the at least one float, the at least one float being arranged for movement within an enclosure which encloses the at least one float and the at least one flexible tube, wherein the at least one float carries filter means arranged to filter liquid being drawn up the at least one tube.

Preferably, the at least one float comprises a hollow chamber to which said at least one tube is connected, the chamber comprising an apertured wall forming said filter means.

Preferably, the apertured wall forms the bottom wall of the float.

Preferably, the bottom surface of the at least one float is profiled or comprises projections which prevent the apertured wall from abutting the bottom surface of the tank and thereby inhibiting the flow of liquid.

Embodiments of the present invention will now be described by way of an example only and with reference to the accompanying drawings.

DETAILED DESCRIPTION OF EMBODIMENTS

Figure 1:
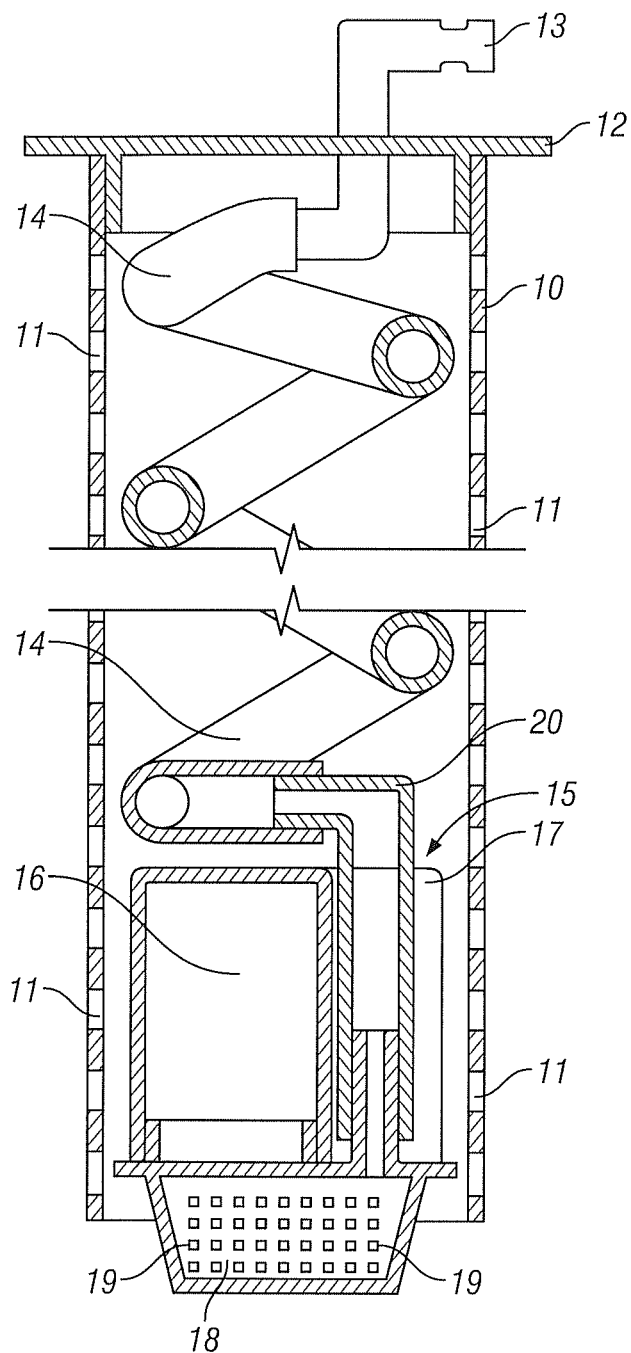
FIG. 1 is a sectional view through a float device according to a first embodiment of the present invention.

Referring to FIG. 1 of the drawings, there is shown a float device, according to a first embodiment of the present invention, for fitting within a circular aperture formed in the top wall of a fuel tank (not shown). The device comprises an elongate circular-section of filter in the form of a metal sleeve 10 provided with an array of apertures 11. The sleeve 10 is open at its lower end and closed at its upper end by a flanged end cap 12, which is arranged for securing around its periphery to the edges of the aperture in the fuel tank.

A rigid feed pipe 13 extends through the end cap 12, the lower end of the pipe 13 being connected to an elongate coiled flexible tube 14 of plastics material. The lower end of the flexible tube 14 is connected to a float 15 by means of a tubular connector 20. The tube 14 is further secured to the float 15 by passing the tube 14 through an eyelet (not shown) disposed upon an upper surface of the float 15. The eyelet (not shown) comprises a plurality of protrusions (not shown) which extend inwardly of the eyelet from an inner periphery thereof. The protrusions (not shown) serve to grip the tube and thus minimises the risk of the tube 14 becoming uncoupled from the tubular connector 20.

The float 15 is generally circular in section and is arranged to freely move vertically within the sleeve 10 with the level of fuel in the tank (not shown). The float 15 comprises a sealed upper chamber 16 which is filled with air and a separate bottom chamber 18 having bottom and side walls which are provided with apertures 19. The bottom chamber 18 comprises an outlet duct connected to the flexible tube 14 via the connector 20.

In use, when fitted to a fuel tank (not shown), the float 15 floats on the surface of the fuel and fuel is drawn into the lower chamber 18 through the apertures 19 and along the flexible tube 14. The apertures 19 serve to filter the fuel and prevent sediment and other matter from being drawn up the flexible tube 14. The apertures 11 in the sleeve 10 also serve to prevent sediment and other matter from entering the device.

As the level of fuel falls, the lower end of the float 15 moves out of the sleeve 10 as shown, thereby allowing fuel to be drawn to a level slightly below the sleeve 10. In this manner, the volume of fuel in the tank can be maximised even if the sleeve 10 does not reach fully to the bottom of the tank.

Figure 2:
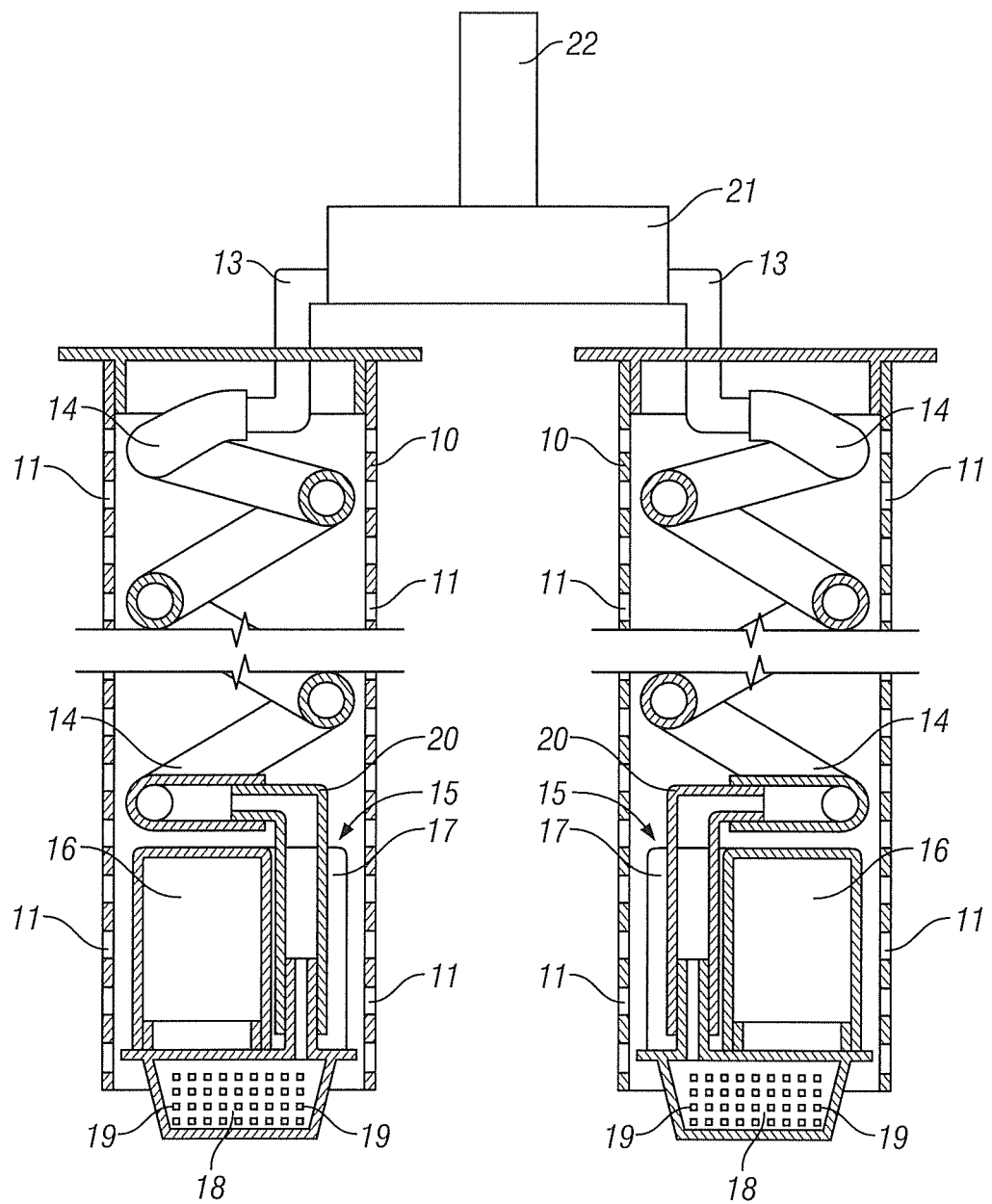
FIG. 2 is a sectional view through a float device according to a second embodiment of the present invention.

Referring to FIG. 2 of the drawings, there is illustrated a float device according to a second embodiment of the present. With this embodiment two float devices of the first embodiment are combined to provide an increased fuel flow from a fuel tank (not shown), for example. The skilled reader will readily recognise however, that more than two float devices may be combined to further increase the extraction of fuel from a fuel tank.

The tube 14 from each float device is coupled to a union 21 which serves to combine the fuel from each tube 14. The union 21 comprises an outlet port (not shown) through which the combined fuel can exit the union into a duct 22. In an alternative embodiment, which is not illustrated, the two or more tubes may be secured to a float 15 to further increase the extraction of fuel from a fuel tank, for example.

By combining two or more float devices, it is possible to locate each float device at various locations within a tank or reservoir at which the fuel collects, In this manner, it is possible to extract fuel, for example from tanks having multiple low points or "well-sites" formed in the base thereof.

Figure 3:
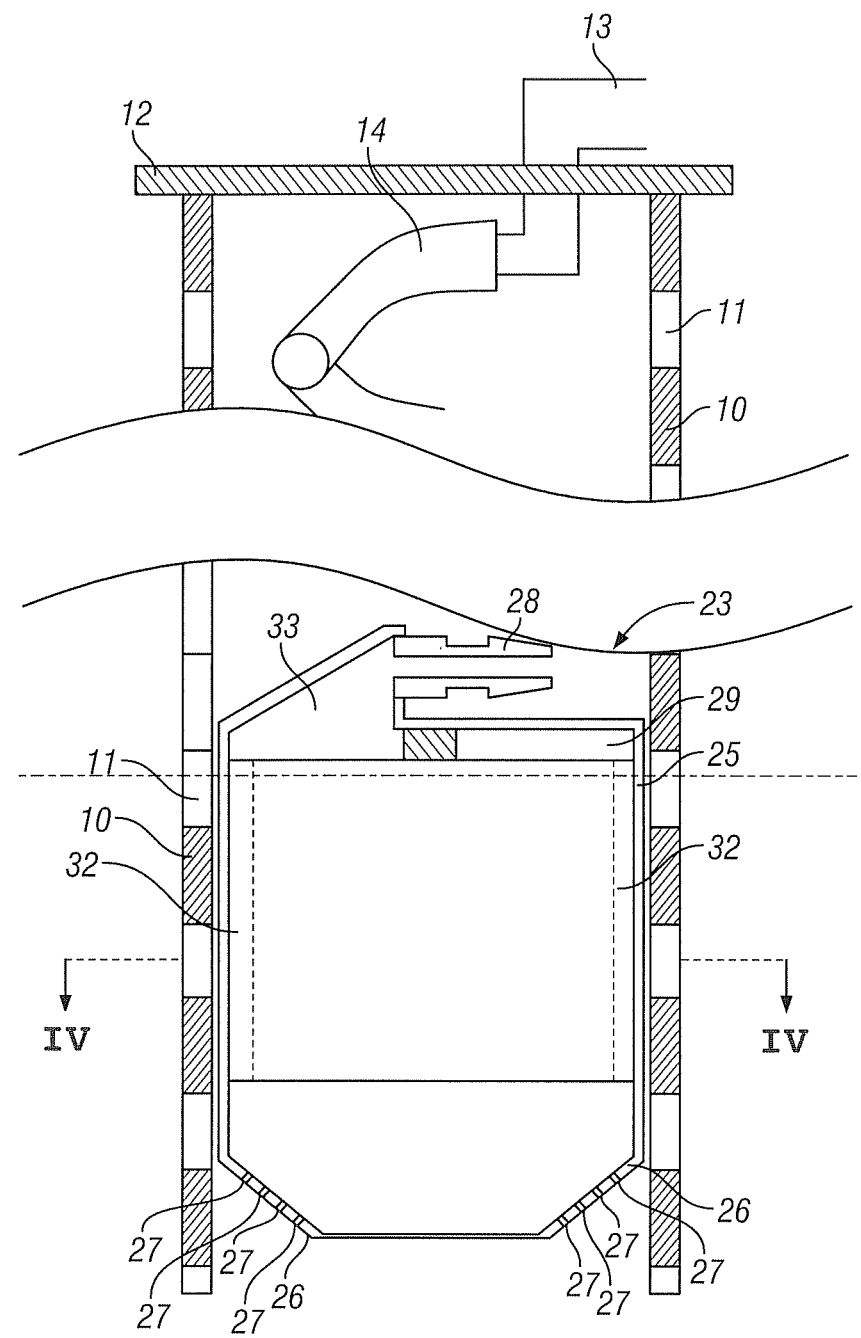
FIG. 3 is a sectional view through a float device according to a third embodiment of the present invention.

Referring to FIG. 3 of the drawings, there is illustrated a sectional view through a float device according to a third embodiment of the present invention, for fitting within a circular aperture formed in the top wall of a fuel tank (not shown). The device comprises an elongate circular-section of filter in the form of a metal sleeve 10 provided with an array of apertures 11. The sleeve 10 is open at its lower end and closed at its upper end by a flanged end cap 12, which is arranged for securing around its periphery to the edges of the aperture in the fuel tank.

A rigid feed pipe 13 extends through the end cap 12 and the lower end of the pipe 13 is connected to an elongate coiled flexible tube 14 of plastics material, for example. The lower end of the flexible tube 14 is connected to a fuel pick-up arrangement 23 comprising a float 24 having a sealed chamber that is filled with air, and a float housing 25. The housing 25 is substantially cylindrical in shape and comprises a substantially inverted frusto-conical lower section 26. The lower section comprises a plurality of apertures 27 formed in the side wall thereof, which serve to filter the fuel and prevent sediment and other matter from being drawn into the housing 25. An upper section of the housing 25 comprises a connector 28 that is arranged to couple with the lower end of the tube 14 to provide a fluid connection between the tube 14 and the interior 29 of the housing 25.

Figure 4:
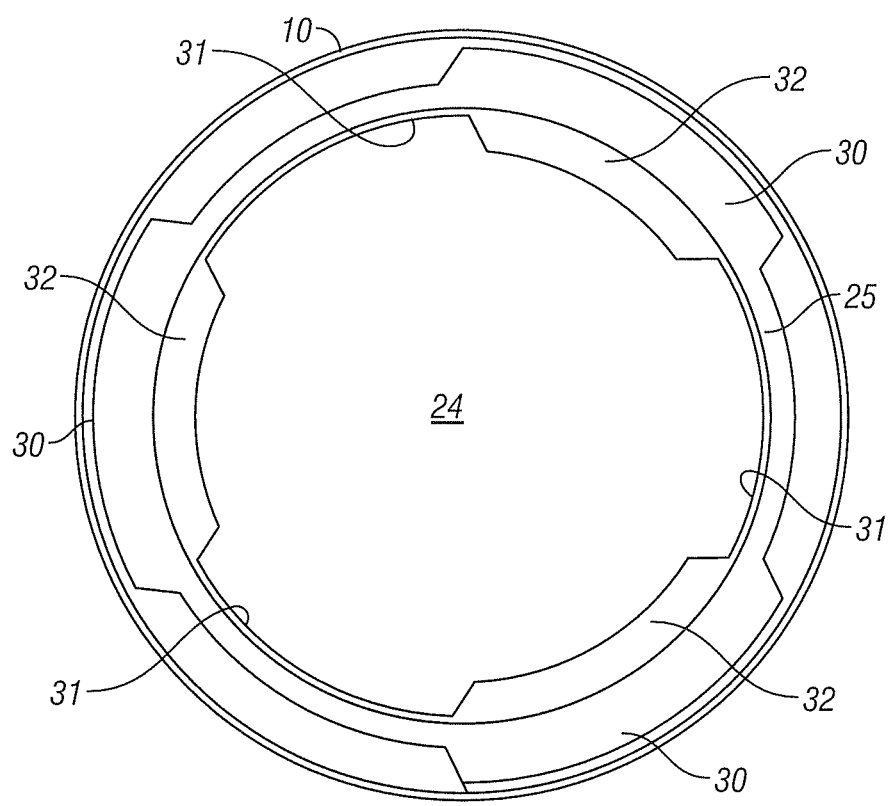
FIG. 4 is a view from the underside of the float device of FIG. 3.

The float 24 is disposed within the housing 25 and causes the arrangement 23 to rise and fall within the sleeve 10 with the level of fuel in the tank. The outer surface of the housing 25 comprises a plurality of spacer elements 30 as illustrated in FIG. 4 of the drawings, which serve to centralise the arrangement 23 within the sleeve 10 as the arrangement moves within the sleeve 10.

The float 24 is substantially cylindrical in shape and comprises an outer surface comprising a plurality of spacer elements 31 which space regions of the outer surface of the float 24 from the inner surface of the housing 25, and which act to centralise the float 24 within the sleeve 10 along a sleeve axis. The regions between the outer surface of the float 24 and the inner surface of the housing 25 that are spaced from each other, define a plurality of channels 32 though which fuel can be drawn from the open lower region of the housing 25 to the tube 14.

In use, when fitted to a fuel tank, the float 24 maintains the housing 25 and thus the fuel pick-up arrangement 23 near the surface of the fuel within the tank (not shown), and fuel is drawn through the sleeve 10 which serves to prevent sediment and other matter from entering the device. The fuel is subsequently drawn into the housing 25 through the apertured lower section 26, which serve to further filter the fuel, and subsequently passes through the channels 32 to the tube 14. In order to prevent the upper surface of the float 24 from sealing against the inner upper surface of the housing 25 and thus blocking an inlet 33 to the tube 14, a spacer block 34 is provided on the inner surface of the upper section of the housing 25, to space the float 24 from the upper surface of the housing 25. The skilled reader will recognise however, that the spacer block 34 could also be disposed on the upper surface of the float.

The combined cross-sectional area of the channels 32 provides for an increased fuel flow rate from the fuel tank compared with the float device of the first embodiment, to supply fuel to machinery requiring a large fuel supply, for example. Moreover, the float device of the third embodiment is more readily installed within fuel tanks compared with that of the second embodiment, since the circular aperture that must be formed within the tank to receive the device can be made easily with a drill. The float device of the second embodiment however, requires a complex shape cut-out of the tank wall that requires several cutting devices.

From the foregoing therefore, it is evident that the fuel device of the present invention provides a simple yet effective means of extracting liquids from tanks and reservoirs.

What is claimed is:

1. A float device for use in drawing liquids such as fuel from a tank or other reservoir, the device comprising:
    a liquid pick-up arrangement arranged to rise and fall with the level of liquid in the tank, and a liquid pick-up duct which comprises a flexible tube having its free end coupled to the liquid pick-up arrangement;
    wherein the liquid pick-up arrangement comprises a float and a float housing, the float being disposed substantially within the float housing, an outer surface of the float and an inner surface of the float housing being spaced from each other to define a liquid pick-up passage therebetween, the liquid pick-up passage being in fluid communication with the tube of the liquid pick-up duct; and
    wherein the liquid pick-up arrangement is arranged for movement within an elongate member which encloses the arrangement and the flexible tube and which comprises an open lower end.

2. A float according to claim 1, wherein: at least one of the float and the housing comprises spacing means for spacing an outer region of the float from an inner region of the housing.

3. A float according to claim 1, wherein: the housing comprises coupling means for coupling the tube thereto.

4. A float device according to claim 1, further comprising: filter means arranged to filter liquid being drawn along the liquid pick-up passage.

5. A float device according to claim 4, wherein: the filter means comprises an apertured lower wall.

6. A float device according to claim 1, wherein: the housing comprises an apertured lower wall, so that fuel can be drawn right down to the point where the liquid pick arrangement abuts the bottom of the tank.

7. A float device according to claim 6, wherein: the lower wall is substantially frusto-conical in shape.

8. A float device according to claim 6, wherein: a bottom surface of the lower wall is profiled or comprises projections which prevent the lower wall from abutting the bottom surface of the tank and thereby inhibiting the flow of liquid.

9. A float device according to claim 1, further comprising: at least two floats and respective float housings arranged to rise and fall with the level of liquid within the tank or reservoir.

10. A float device according to claim 9, wherein: each of the at least two floats and respective float housings comprise a liquid pick-up duct each comprising a flexible tube having a free end thereof coupled to a respective float housing.

11. A float device according to claim 9, further comprising: at least two liquid pick-up ducts each comprising a flexible tube having a free end coupled to a respective float housing.

12. A float device according to claim 11, wherein: the liquid from the at least two liquid pick-up ducts is combined.

13. A float device according to claim 9, wherein: the at least two floats and respective float housings are arranged for vertical movement within respective elongate members.

14. A float device according to claim 1, wherein: each of said float housing is arranged to extend partially below said member when the level of fuel in said tank is low.

15. A float device according to claim 1, wherein:
    the elongate member is tubular.

16. A float device according to claim 15, wherein:
    the tubular member comprises a filter.

17. A float device for use in drawing liquids such as fuel from a tank or other reservoir, the device comprising:
    a liquid pick-up arrangement arranged to rise and fall with the level of liquid in the tank, and a liquid pick-up duct which comprises a flexible tube having its free end coupled to the liquid pick-up arrangement,
    wherein the liquid pick-up arrangement comprises comprising a float and a float housing, the float and float housing defining a liquid pick-up passage between an outer surface of the float and an inner surface of the float housing, and
    wherein the liquid pick-up arrangement is being arranged for movement within an elongate member which encloses the arrangement and the flexible tube and which comprises an open lower end.

18. A float device for use in drawing liquids such as fuel from a tank or other reservoir, the device comprising:
    a liquid pick-up arrangement arranged to rise and fall with the level of liquid in the tank, and a liquid pick-up duct which comprises a flexible tube having its free end coupled to the liquid pick-up arrangement,
    wherein the liquid pick-up arrangement comprises comprising a float and a float housing, the float and float housing defining a liquid pick-up passage, wherein the liquid pick-up arrangement is being arranged for movement within an elongate member which encloses the arrangement and the flexible tube and which comprises an open lower end, wherein at least one of the float and the housing comprises spacing means for spacing an outer region of the float from an inner region of the housing, and wherein the liquid pick-up passage is substantially defined by the region between the outer surface of the float and the inner surface of the housing that are spaced from each other.

* * * * *